United States Patent [19]
Simon et al.

[11] Patent Number: 5,987,034
[45] Date of Patent: *Nov. 16, 1999

[54] ATM CELLS WITHIN FRAME RELAY TECHNOLOGY

[75] Inventors: Robert Simon; Mark Rumer; Robert A. Land, all of Santa Barbara; David E. Swanson, Goleta, all of Calif.

[73] Assignee: Cisco Technology, Inc., San Jose, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/705,236

[22] Filed: Aug. 30, 1996

[51] Int. Cl.⁶ .................................................. H04L 12/56
[52] U.S. Cl. ........................................... 370/465; 370/474
[58] Field of Search ..................... 370/469, 395, 370/396, 397, 389, 465, 474, 466, 473

[56] References Cited

U.S. PATENT DOCUMENTS

| | | | |
|---|---|---|---|
| 5,315,588 | 5/1994 | Kajiwara et al. | 370/395 |
| 5,361,259 | 11/1994 | Hunt et al. | 370/402 |
| 5,490,140 | 2/1996 | Abensour et al. | 370/397 |
| 5,490,141 | 2/1996 | Lai et al. | 370/397 |
| 5,526,349 | 6/1996 | Diaz et al. | 370/438 |
| 5,625,625 | 4/1997 | Oskouy et al. | 370/474 |

OTHER PUBLICATIONS

Kummerle, K., IBM, Switzerland, Multiplexor Performance for Integrated Line and Packet Switched Traffic, (1974), pp. 507–515.

*Primary Examiner*—Chau Nguyen
*Attorney, Agent, or Firm*—Blakely, Sokoloff, Taylor & Zafman LLP

[57] ABSTRACT

A frame relay communications network consists of a number of interconnected nodes. The network nodes include segmentation and reassembly device for fragmenting variable length frames of user data into packets of a predefined length. A preferred embodiment uses ATM AAL5 segmentation and reassembly to construct cells. Header and trailer information is added to each of the cells for transport across the frame relay network.

8 Claims, 4 Drawing Sheets

| VCI (5-4) | VPI (3-0) | PTI (2) | 0 | 210 |
|---|---|---|---|---|
| VCI (3-0) | PTI (1-0) | CCP | 1 | |

FIG. 4

| FLAG | FRELL | CRC | FLAG | 214 |
|---|---|---|---|---|

FIG. 5A

| FLAG | EFH (218) | FRELL | CRC | FLAG | 216 |
|---|---|---|---|---|---|

FIG. 5B

ATM CELLS WITHIN FRAME RELAY TECHNOLOGY

FIELD OF THE INVENTION

The present invention relates generally to the field of packet switching network communications and, more specifically, to the segmentation of large frames transported across such a network to enable fair and efficient use of trunk bandwidth.

BACKGROUND

The desire to integrate data, voice, image and video over high speed digital trunks has led to the development of a variety of packet switching techniques. One such technique is called frame relay. A frame relay network provides a user with multiple independent data links to one or more destinations. User traffic on these data links is statistically multiplexed to provide efficient use of access lines and network resources. Since the multiplexing is at the link layer, end-to-end delay is minimized. Frame relay networks transfer user traffic without regard to content, thereby providing service which is effectively as transparent as a leased line. A frame relay network typically consists of a number of interconnected nodes which are capable of receiving data from other network nodes and forwarding that data through to other network nodes to its ultimate destination. Nodes are interconnected by transmission paths, each of which supports one or more virtual circuits. Communication from one user to another can thus be made using the pre-defined network connections of the virtual circuits.

Asynchronous Transfer Mode (ATM) is a second packet switching technology that provides users with the ability to connect to one or more users in a transparent fashion. Unlike the variable length packets used by frame relay services, ATM service is based on switching fixed length packets of data known as cells. Cell switching, as it is called, is gaining popularity for a variety of reasons. First, switch architectures can be optimized to switch cells at much higher speeds than variable length packets. Second, multiple services requiring a variety of quality of service guarantees can be provided simultaneously. ATM user traffic must be segmented into cells, transmitted, then reassembled back into its original form. This segmentation and reassembly (SAR) process is done in a standardized way, regardless of the carrier providing the ATM service.

Although the use of variable length packets in frame relay can be more efficient in terms of overhead and bandwidth used when compared with the fixed length cells used in ATM, other problems, such as delay and latency, present themselves. In frame based environments, passing traffic from one end to another is somewhat unpredictable by nature. For example, if one virtual circuit is using a significant amount of bandwidth, it will have a tendency to choke out other sources. Also, if one virtual circuit is transporting relatively large frames through the network, other circuits with smaller frames may suffer. This is known as latency. For example, it is not uncommon for two sources, one transmitting large frames and the other transmitting smaller frames to be transported over the same wire. As the larger frame is being transported over the wire, the smaller frame will have to wait a relatively long period of time before it is transmitted on the wire. If both sources are transmitting latency insensitive traffic, e.g., data, this may not be a problem. However, if the smaller frame source is transmitting multimedia traffic (e.g., especially voice) which is very time sensitive, this latency can seriously degrade the quality of the service provided by the network. The latency problem is compounded if the wire is a relatively slow link.

One solution to the problems of latency and delay has been to fragment large frames into smaller packets for transmission through a frame relay network. Unfortunately, no standardized method of frame relay fragmentation has been adopted. As a result, a number of non-standard fragmentation schemes have been used. These non-standard fragmentation schemes lead to interoperability problems, generally resulting in increased user costs. In addition, for those users who do not have access to frame relay networks that use frame fragmentation schemes, the problems of latency and delay remain.

SUMMARY AND OBJECTS OF THE INVENTION

It is therefore an object of the present invention to provide a method for frame fragmentation within a frame relay network to reduce the problems of latency and delay.

It is an additional object of the present invention to allow the use of a single segmentation and reassembly method for both frame relay and ATM networks.

It is a further object of the present invention to provide an efficient means for data units to be converted between frame relay trunk traffic and ATM trunk traffic.

These and other objects of the invention are achieved by the use of ATM segmentation and reassembly methodologies in a frame relay network. A frame relay network consists of a number of interconnected nodes. Network nodes which utilize the invention include segmentation and reassembly means for fragmenting variable length frames of user data into packets of a predefined length. A preferred embodiment uses ATM AAL5 segmentation and reassembly to construct cells. Header and trailer information is added to each of the cells for transport across the frame relay network.

Other objects, features and advantages of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements, and in which:

FIG. 4 illustrates a Frell header according to one embodiment;

FIG. 5a illustrates a Frell formatted for transport across a leased line according to one embodiment; and FIG. 5b illustrates a Frell formatted for transport across a public network according to one embodiment.

DETAILED DESCRIPUfION

A method and apparatus to allow frame fragmentation in a frame relay network using ATM methodologies is described. According to one embodiment, in a frame relay network consisting of a number of interconnected nodes, variable length frames of user data are fragmented into packets of a predefined length. One embodiment uses ATM AAL5 segmentation and reassembly methodologies to construct cell-like packets. Header and trailer information is added to each of the cell-like packets for transport across the frame relay network.

Figure 1:
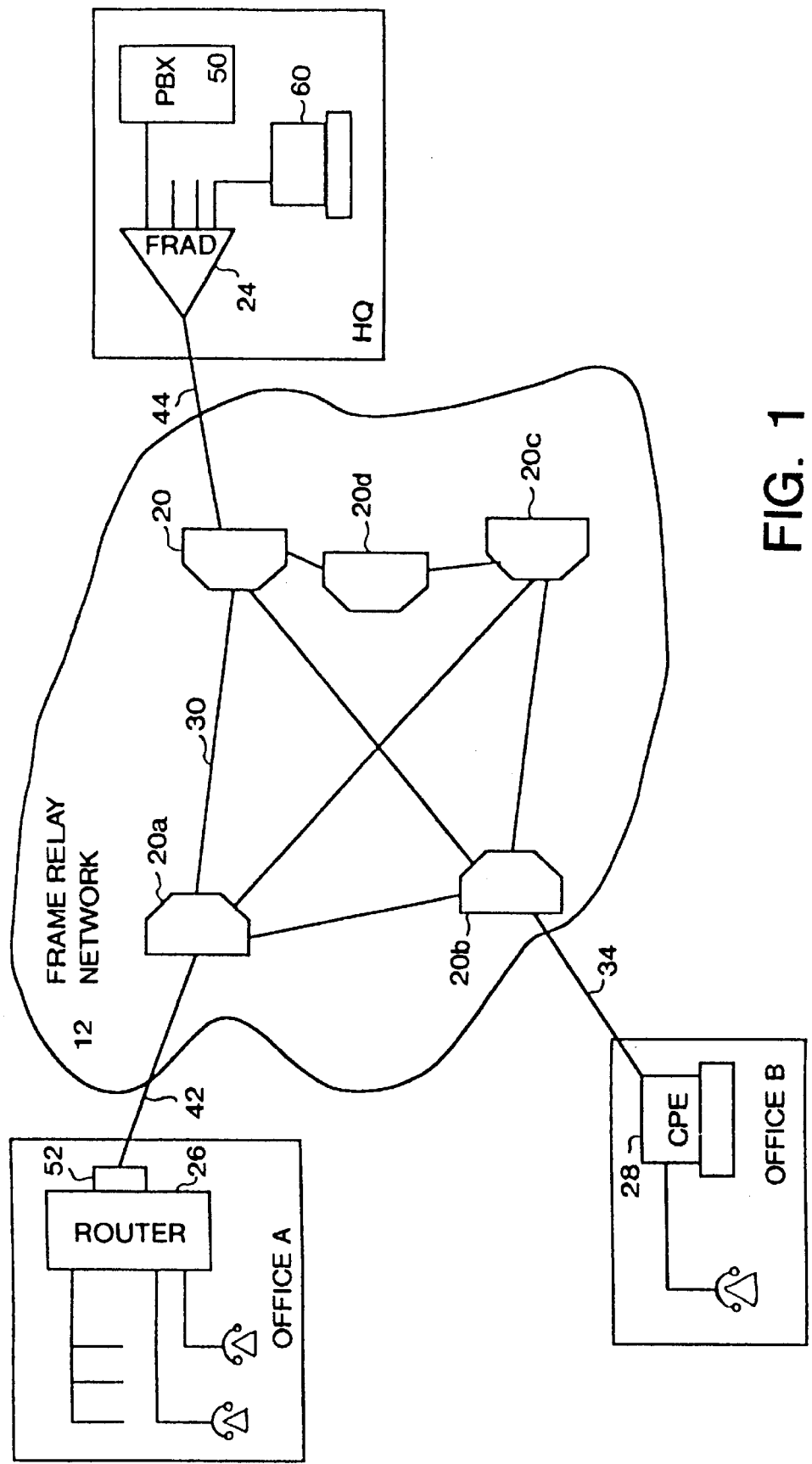
FIG. 1 illustrates a frame relay network incorporating the apparatus and methods of the present invention.

As shown in FIG. 1, in a fully integrated frame relay network 12, a variety of switching nodes 20–20d are present. Each node 20–20d is interconnected to other network nodes 20–20d by a variety of transmission paths 30. (Note that for clarity only one transmission path 30 has been labeled. Those skilled in the art will appreciate that all of the transmission paths between network nodes 20–20d are substantially similar.) Each transmission path 30 supports a number of virtual circuits.

Access to frame relay network 12 is accomplished in a variety of ways. For example, a host 60 and a PBX 50 located at a central office HQ access frame relay network 12 via frame relay access device (FRAD) 24. FRAD 24 is coupled to a network node 20 via a leased line 44. FRAD 24 encapsulates transmitted data from host 60 into the frame relay format for transport through network 12 as specified by the Frame Relay User-to-Network Interface (UNI). As is known by those skilled in the art, FRAD 24 may be embedded in a bridge, a router (such as router 26 in remote office A), a multiplexer, or other stand alone device. Alternatively, FRAD 24 may be an expansion card with frame relay access functionality which is found within the chassis of host 60.

A local area network (LAN) located at Office A, accesses network 12 (as noted parenthetically above) via router 26. It will be appreciated that router 26 comprises a frame relay access device that performs the encapsulation function discussed above with regard to FRAD 24. A port 52 of router 26 is connected to a network node 20a via a second leased line 42, thereby allowing the LAN to access network 12.

Customer premises equipment (CPE) 28 at Office B has access to frame relay network 12 via leased line 34. It will be appreciated that CPE 28 has a frame relay access device incorporated within its chassis as an expansion card as described above.

The connections between the HQ, Office A and Office B and network 12 have been described as leased lines 34, 42 and 44. This is more accurately a description of the physical connections into network 12.

As described above, the variable length packets used in frame relay networks can lead to problems such as delay and latency. If any or all of lines 34, 42 and 44 are relatively low speed, then voice data will be delayed by frame relay data. For example, if host 60 generates a large frame relay frame, and FRAD 24 places that frame on line 44, voice traffic from PBX 50 will have to wait until the frame relay frame has been sent across line 44. If line 44 is running at 64K bits per second, and a 4K-byte frame is sent, the voice traffic could be delayed for up to ½ second. This will cause a lengthy distortion in the voice traffic at the receiving end. To overcome these problems, the present invention provides a means for fragmenting frames into smaller packets for transmission through frame relay network 12. Unlike fragmentation methods of the prior art, however, the present invention allows the use of segmentation methodologies adapted from ATM networks.

In ATM theory, an ATM Adaption Layer (AAL) performs a segmentation and reassembly (SAR) function. During transmission, higher level services pass user data to the AAL where, first, a convergence sublayer forms convergence layer protocol data units (CS-PDUs). These CS-PDUs will, generally, be larger than the payload capacity of an ATM cell. Therefore, a second sublayer, the segmentation and reassembly (SAR) sublayer, accepts the variable length CS-PDUs and fragments them into appropriate payloads (48 octets) for transmission. These payloads are referred to as segmentation and reassembly protocol data units (SAR-PDUs) and are passed to lower layers in the ATM protocol model for further processing. During reception, a reverse operation takes place and the SAR sublayer is responsible for reassembling messages as they are received.

Figure 2:
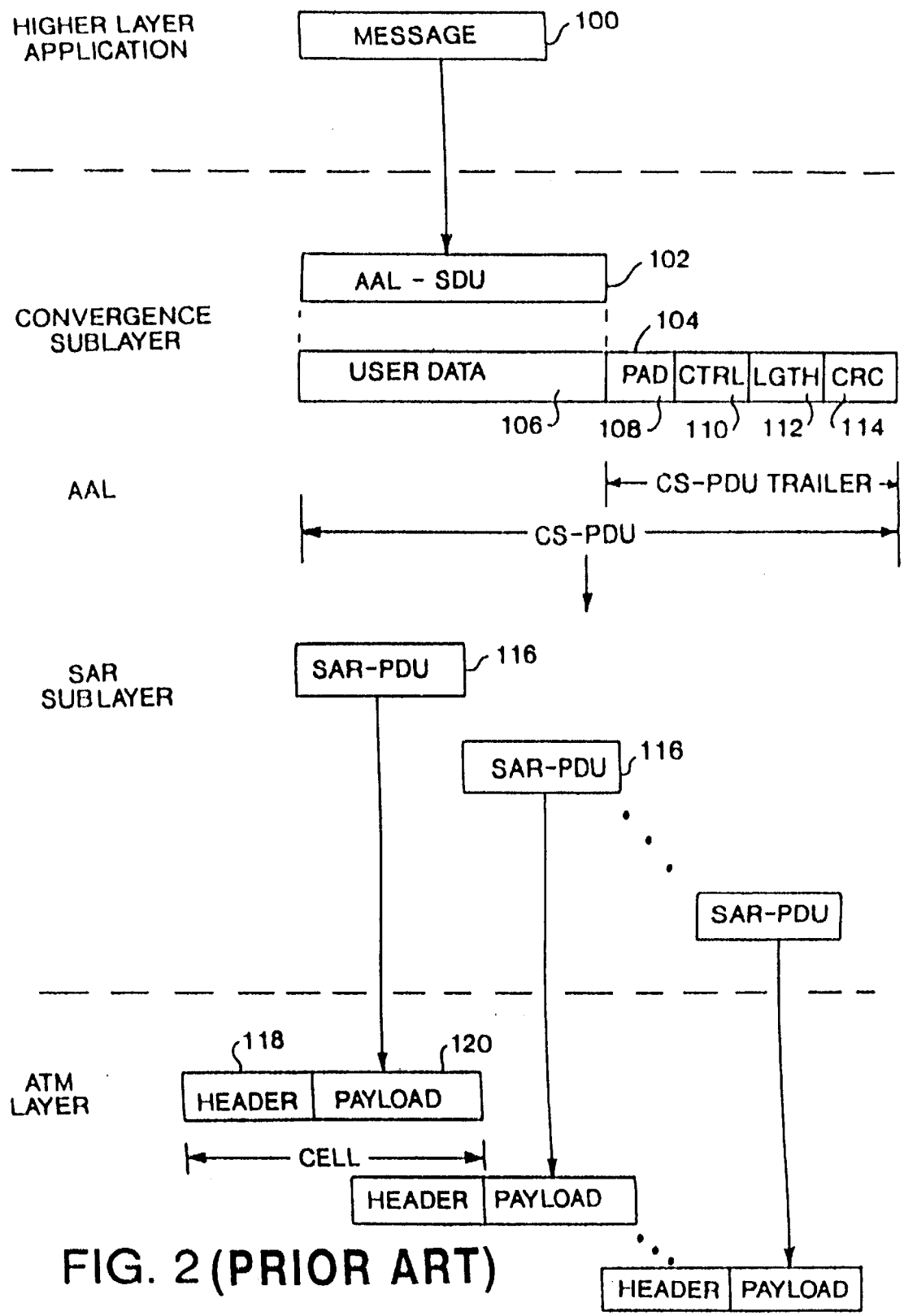
FIG. 2 illustrates AAL5 segmentation and reassembly methodologies.

Several ATM AALs have been developed for various applications. AAL Type 5 (AAL5) was designed for variable bit rate, connection-oriented services and provides good error detection capabilities and high line efficiency. The AAL5 methodologies are illustrated in FIG. 2. During transmission, a user message 100 is passed from higher level protocols to the AAL, where it is referred to as an AAL Service Data Unit (AAL-SDU) 102. As shown in FIG. 2, the AAL5 convergence sublayer uses the AAL-SDU 102 to create variable length protocol data units (CS-PDUs) 104. The CS-PDUs are made up of the following fields. The User Data Field 106 comprises data from the higher layer protocols and may be up to 65,536 octets in length. The Pad field 108 is used to align the entire CS-PDU 104 on a 48-octet boundary (i.e., the entire CSPDU 104 is a multiple of 48-octets in length). The Control field 110 is two octets in length and is presently reserved for future use. The Length field 112 indicates the actual length of the User Data Field 106 and is two octets long. The CRC-32 field 114 is appended to provide error detection in the CS-PDU 104.

CS-PDUs are passed to the AAL5 SAR sublayer. The SAR sublayer fragments the CS-PDUs to fixed-length SAR-PDUs 116, each 48-octets long. There are no new headers or trailers added by the SAR sublayer in AAL5. No padding is necessary because the CS-PDU 104 was padded to a multiple of 48-octets. As further shown in FIG. 2, the SAR-PDU 116 is passed to the ATM layer where a 5-octet header 118 is added to form an ATM cell 120.

The present invention takes advantage of the SAR methods provided by AAL5. To avoid latency and delay, standalone FRAD 24 and embedded FRADS 26 and 28 implement frame fragmentation according to AAL5 SAR methodologies. (Those skilled in the art will appreciate that while AAL5 is used in one implementation, other ATM AAL SAR methodologies could also be used.) More specifically, user frames of data are transmitted to a FRAD (e.g., FRAD 24) where the frame is buffered. Each frame is then processed by a SAR unit within the node such that the variable length frame is fragmented into multiple 48-octet PDUs as described above. The fragmentation is performed according to the AAL5 procedure described above.

Figure 3:
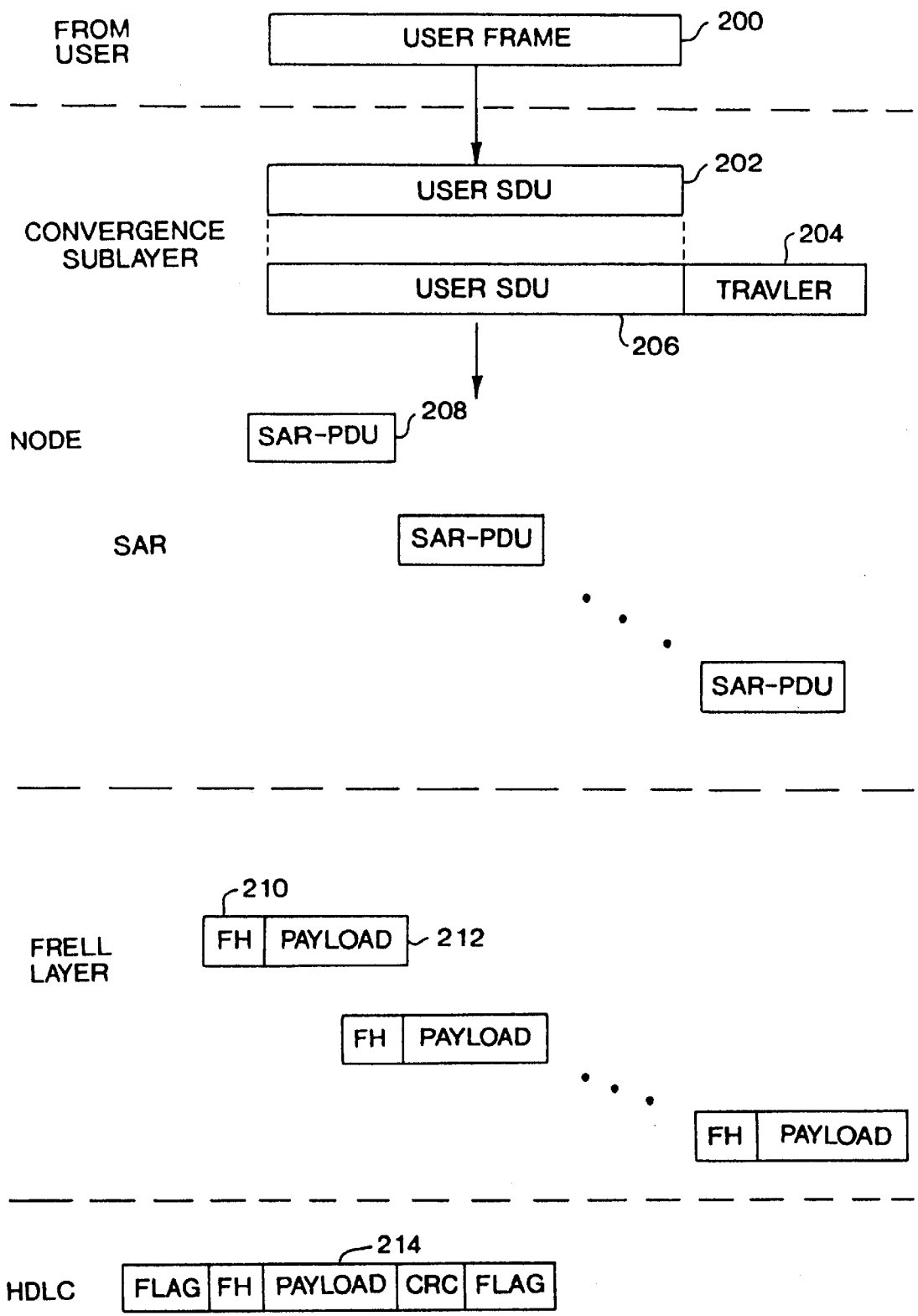
FIG. 3 illustrates Frell formation using AAL5 methodologies according to one embodiment.

FIG. 3 illustrates this process. A user frame 200 is transmitted from host 60 to FRAD 24, for example. At FRAD 24, the user frame 200 is buffered until it can be serviced. When the frame is serviced, it is passed to a SAR unit within FRAD 24. Within the SAR unit, the frame 200, now referred to as a User-SDU 202, has trailer information 204 appended to create a CS-PDU 206 as described above. The CS-PDU 206 is then fragmented into fixed-length SAR-PDUs 208, each 48-octets long. The fragmentation procedure follows the same AAL5 methodology described above.

Each SAR-PDU 208 has a 2-octet header FH 210 appended to form a 50-octet packet 212. The format of these headers 210 is shown in FIG. 4. The header contains fields for 10-bits of connection information (VCI, VPI); 3-bits of payload type (PTI); and a cell loss priority (CLP) bit. The 50-octet packets are referred to as "Frells" 212, a name which implies the cell-like (from ATM) attributes of the frame relay packets.

Once each Frell 212 has been assembled, it is passed from the SAR unit for transmission across frame relay network 12. In particular, each Frell 212 is transported (according to the VPI, VCI header information) to an appropriate port within FRAD 24. At the port, an HDLC controller appends further header and trailer information required for transport to frame relay network 12. Frame relay Flags are added to each Frell as headers and trailers. In addition, two CRC-octets are added prior to the Flag trailer. If the Frell is to be transported over a public frame relay network, e.g. frame relay network 12 in FIG. 1, then a 2-byte encapsulating frame relay header (EFH) 218 is added at the beginning of the Frell, prior to the Frell header. The resulting packet is then ready to be transmitted through the Frame Relay Network to a destination node. FIG. 5a shows the format of the 52-octet packet 214 for transmission across a leased line while FIG. 5b shows a 54-octet packet 216 with an EFH 218 added for transmission across a public frame relay network. Those skilled in the art will realize that when one Frell is immediately followed by another Frell, only one Flag octet need separate the two Frells.

At the destination node, as each packet is received, an HDLC controller validates the CRC and strips off the Flag bytes and the CRC bytes. The remaining Frell is then associated with other Frells from the same original user data frame and the frame is reassembled according to AAL5 methodologies. When the frame has been reassembled, it is transmitted from the destination node to the destination user for further processing.

Thus, a method and apparatus for providing ATM segmentation and reassembly methodologies in a frame relay network has been described. In the foregoing specification, the invention has been described with reference to specific exemplary embodiments thereof. It will, however, be clear that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method of transferring data across a frame relay network by fragmenting user data frames into packets having a fixed length, the method comprising the steps of:

receiving at a first node of the frame relay network a user data frame;

appending trailer information to the user data frame to form a first data unit;

segmenting the first data unit into a plurality of packets, each of the packets having a fixed length;

appending to each of the packets a frame relay header, the frame relay header comprising network routing information operable to direct the packets of data across the frame relay communications network; and transmitting the packets from the first node to a second node of the frame relay communications network.

2. The method of claim 1 wherein the segmenting further comprises packets configured to provide variable bit rate connections.

3. The method of claim 2 wherein the frame relay header further comprises virtual circuit information, payload type information, and cell loss priority information.

4. The method of claim 3 wherein said step of appending further comprises attaching beginning-of-frame, end-of-frame and error detection information to the packet.

5. A frame relay access device comprising:

a buffer coupled to an input of the frame relay access device, wherein the buffer is operable to receive a user frame; and a segmentation and reassembly unit, wherein the segmentation and reassembly unit is operable to append trailer information to the user frame, the segmentation and reassembly unit is further operable to segment the appended trailer information and user frame into packets having a fixed length and configured to transmit data solely across a frame relay communications network.

6. A frame relay access device as in claim 5 wherein said segmenting further comprises packets configured to provide variable bit rate connections.

7. The method of claim 1 wherein the step of segmenting the user data frame comprises using an asynchronous transfer mode adaptation layer to generate packets, wherein each packet is forty-eight octets in length.

8. The method of claim 1 wherein the segmenting further comprises packets configured to provide error detection.

* * * * *